Sept. 6, 1960 W. K. LIND 2,951,637

FLOATING DECIMAL SYSTEM

Filed Jan. 11, 1954 11 Sheets-Sheet 1

INVENTOR.
WARREN K. LIND

BY John P. Sority

ATTORNEY

INVENTOR
WARREN K. LIND
BY John P. Dainty
ATTORNEY

INVENTOR.
WARREN K. LIND
BY
John P. Dainty
ATTORNEY

Sept. 6, 1960 W. K. LIND 2,951,637

FLOATING DECIMAL SYSTEM

Filed Jan. 11, 1954 11 Sheets-Sheet 4

INVENTOR.
WARREN K. LIND

BY John P. Sority

ATTORNEY

Sept. 6, 1960 W. K. LIND 2,951,637

FLOATING DECIMAL SYSTEM

Filed Jan. 11, 1954 11 Sheets-Sheet 5

INVENTOR.
WARREN K. LIND
BY John P. Sairty
ATTORNEY

*INVENTOR.*
WARREN K. LIND
*BY*
John P. Sauty
ATTORNEY

INVENTOR.
WARREN K. LIND
BY
John P. Dority
ATTORNEY

INVENTOR
WARREN K. LIND
BY John P. Daily
ATTORNEY

INVENTOR.
WARREN K. LIND
BY John P. Saity
ATTORNEY

Sept. 6, 1960 W. K. LIND 2,951,637
FLOATING DECIMAL SYSTEM
Filed Jan. 11, 1954 11 Sheets-Sheet 10
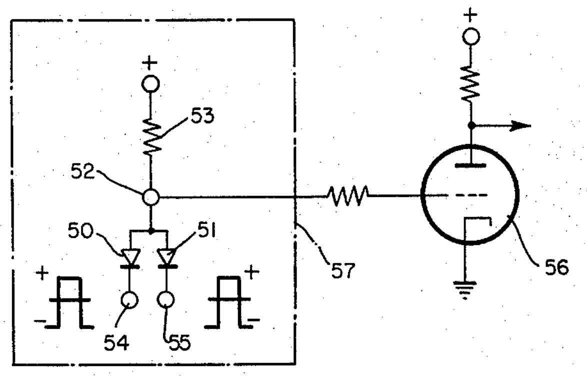
FIG. 5
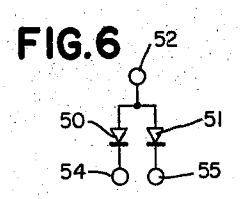
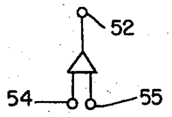
FIG. 7
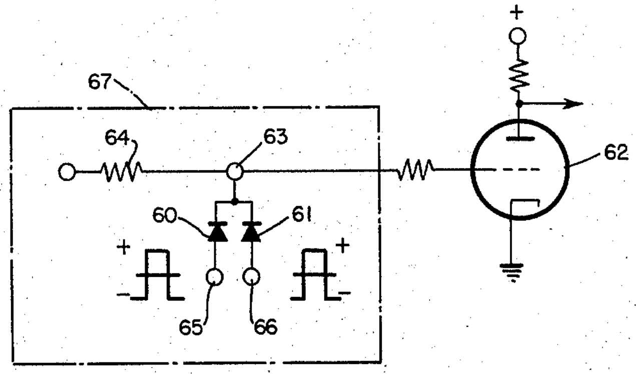
FIG. 8
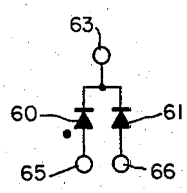
FIG. 9
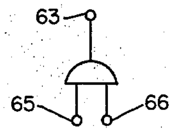
FIG. 10
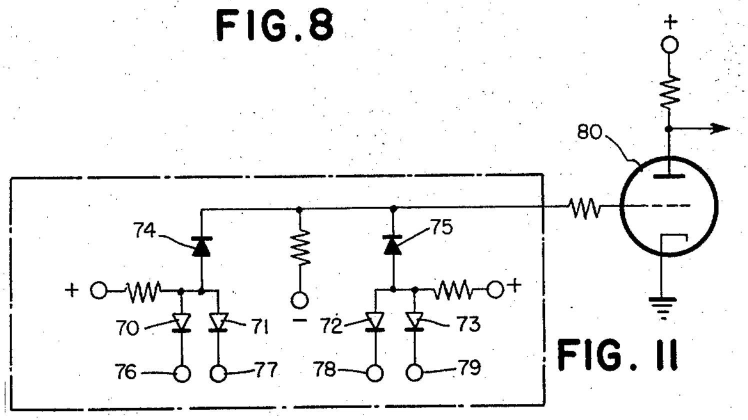
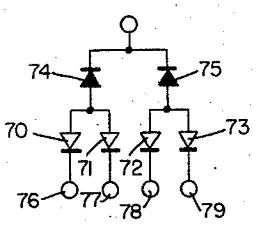
FIG. 12
INVENTORS
WARREN K. LIND
BY John P. Dainty
ATTORNEY Sept. 6, 1960 W. K. LIND 2,951,637

FLOATING DECIMAL SYSTEM

Filed Jan. 11, 1954 11 Sheets-Sheet 11

INVENTOR.
WARREN K. LIND

BY John P. Dority

ATTORNEY

United States Patent Office 2,951,637

Patented Sept. 6, 1960

2,951,637

FLOATING DECIMAL SYSTEM

Warren K. Lind, Vestal, N.Y., assignor to International Business Machines Corporation, New York, N.Y., a corporation of New York Filed Jan. 11, 1954, Ser. No. 403,380

4 Claims. (Cl. 235—159)

This invention relates to data processing machines and particularly to shift and count mechanism therefor.

In high speed digital data processing machines it is often desirable to shift numeric data standing in a storage device so that the first significant digit of the data occupies the highest order position of the storage device. Under this condition the number of shifts made to place the first significant digit in the highest order position must be stored in order that the exponent of the factor of a resultant answer may be modified in accordance with the shifts performed. Such a system is frequently referred to as a floating decimal system. It is accordingly an object of this invention to provide improved floating decimal mechanism for a data storage and processing machine.

Another object is to provide improved shift mechanism for a data storage device.

Another object is to provide improved mechanism for shifting data in a plurality of orders of a data storage device while adding to another order of the data storage device without a shift.

Still another object is to provide improved means for terminating the shift of data in a data storage device.

According to the embodiment of the invention disclosed herein a storage device comprising a plurality of orders of data storage elements is provided with a channel for conveying data from the storage elements in successive time intervals. The data may be entered directly into an adder or through a delay device into the adder. The adder exhibits a delay of one time interval and feeds data from its output back to the storage element. Data may be repeatedly fed directly through the adder and have a value added thereto on each pass through the adder and entered back into the storage element without a shift, or data may be fed through the delay element and through the adder and entered into adjacent storage elements to provide a left shift. Upon the appearance of a significant digit in the highest order of the storage device, the shift operation is terminated and the value standing in the order or orders not shifted is indicative of the number of shifts performed. This value may be subsequently used to modify the factor of a subsequently derived value to properly place the decimal point or produce the correct exponent of the factor.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1*a* through 1*g*, inclusive, constitute a block diagram of the circuits of the floating decimal system.

Figs. 5 through 24, inclusive, are schematic representations of circuit elements which are shown in the various block diagrams.

GENERAL DESCRIPTION

Figure 4:
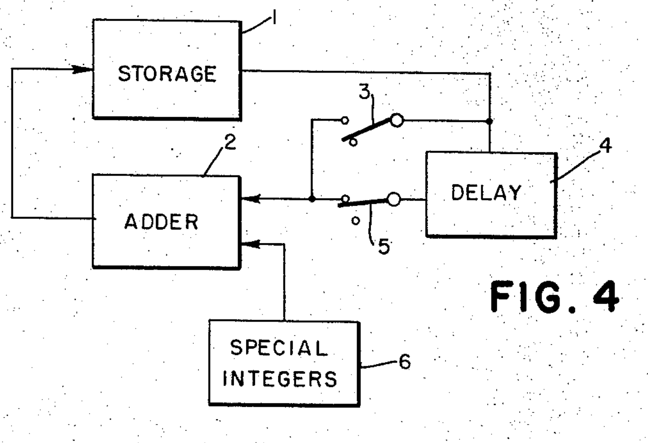
Fig. 4 is a general diagram of the floating decimal system.
Figure 2:
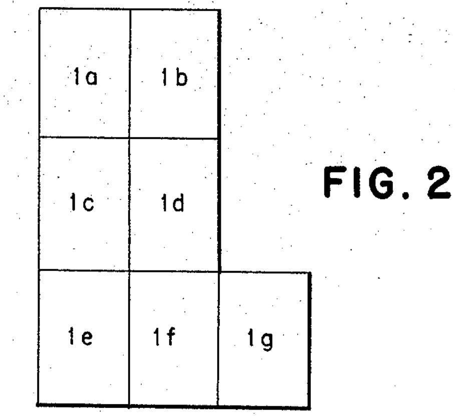
Fig. 2 is a diagram showing the manner in which Figs. 1*a* through 1*g* should be joined together.

Referring to Fig. 4 there is shown a diagram of a floating decimal system according to the present invention. A storage device 1 receives data from the output of an adder 2. The input to one side of adder 2 may come directly from storage device 1 through a switch 3 or through a delay element 4 and through a switch 5. The other side of the adder has the output from a second source of data shown at 6 is fed thereto.

In the present system it has been chosen to represent the digits of numeric data in accordance with a seven-bit biquinary code.

In the seven-bit biquinary code representation of a digit, seven elements each capable of assuming two stable conditions are assigned to the seven bits of the biquinary code. The first five of these elements respectively pertain to the quinary bits Q0, Q1, Q2, Q3, and Q4. The next two elements respectively pertain to the binary bits B0 and B5. Any of the digits can be represented by selectively activating one element in the quinary level and one element in the binary level. For example, the digit 3 is represented by activating the B0 element and the Q3 element. The digit 7 is represented by activating the B5 element and the Q2 element. In this fashion each digit can be represented by two active elements, one in each level.

It will be noted that each digit is represented in the biquinary code by one and only one active element in the quinary level, and one and only one active element in the binary level. This feature makes the use of the biquinary code advantageous for performing automatic validity checks.

DETAILED DESCRIPTION

*Timing or clocking pulses*

The timing or clocking circuits 11 (Fig. 1*f*) generate various timing or clocking pulses under the control of timing spots magnetically recorded on the drum 12, this being done in accordance with techniques that are well known in the art. These timing pulses are supplied to the various components of the floating decimal system for controlling various switching functions, as will be described more fully hereinafter.

*Tube and diode circuits*

Attention will be given now to various typical forms of tubes and diode circuits which are shown diagrammatically in Figs. 1*a* to 1*g*. In Fig. 5, for example, there is shown a typical coincidence switch, otherwise known as a logical "and" circuit comprising the germanium crystal diodes 50 and 51. The common terminal 52 of the diodes 50 and 51 is connected through a voltage-dropping resistance 53 to a source of positive voltage (not shown). The individual input terminals 54 and 55 of the diodes 50 and 51 are normally biased negatively so that the common terminal 52 is normally at a negative potential with respect to ground. If coincident positive pulses are applied to the terminals 54 and 55, the potential of the terminal 52 is raised. However, if only one of the terminals 54 and 55 is pulsed positively, the potential of the terminal 52 is not raised appreciably. A voltage responsive device, such as an electron tube amplifier 56, is controlled by the potential of the terminal 52 to furnish a usable output voltage pulse whenever a coincidence of positive input pulses is detected. For simplicity, the portion of the coincidence switch shown in the broken line rectangle 57, Fig. 5, is generally represented as shown in Fig. 6, omitting the dropping resistor 53 and the connection to the positive voltage source. The coincidence switch shown diagrammatically in Fig. 6 is frequently represented in block diagram form as shown in Fig. 7. In block diagram form, there are frequently more than two input terminals such as 54 and 55 of Fig. 6, and it is to be understood that each of the input terminals into the block diagram representation is to have a diode connected thereto in the same manner as diode 51 is connected to terminal 55 in Fig. 5, and the anode of the diode is connected to terminal 52.

Figure 19:
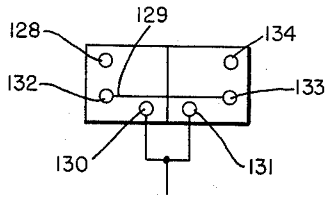

In Fig. 8 there is shown a typical mixer, otherwise known as a logical "or" circuit, comprising the diodes 60 and 61. Diodes which are employed in mixers are shaded in the present drawings to distinguish them from the diodes which are employed in switches. A voltage responsive device, represented by the electron tube amplifier 62, is controlled by the potential of the common output terminal 63 of the diodes 60 and 61, which terminal is connected by a resistor 64 to a source of negative voltage (not shown). If either one (or both) of the diode input terminals 65 and 66 is pulsed positively, the potential of the terminal 63 is raised. For convenience, the portion of the mixer circuit shown in the broken line rectangle 67, Fig. 8, is generally represented as shown in Fig. 19, omitting the resistor 64 and the connection to the negative voltage source. A block diagram representation of the mixer represented in Fig. 9 is frequently employed. This block diagram representation is indicated in Fig. 10, it being understood that more than the two shown input terminals may be provided and that each additional input terminal will be provided with an additional diode, such as the diodes 60 and 61 of Fig. 8, and that the cathode of each of these additional diodes will be connected to the terminal 63.

Figure 22:
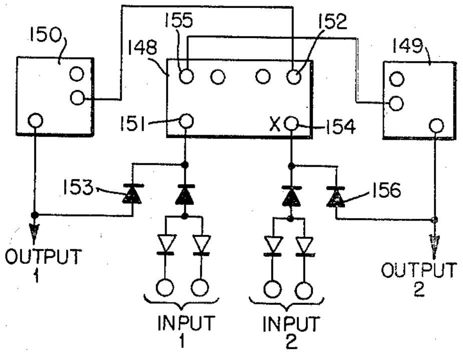

In Fig. 11 there is shown a circuit wherein separate switches, respectively comprising the diode pairs 70—71 and 72—73, feed through the respective mixer diodes 74 and 75 to the voltage responsive device represented by the electronic amplifier 80. A coincidence of positive voltage pulses at the input terminals 76 and 77, or at the input terminals 78 and 79, causes the grid voltage of the tube 80 to rise. Fig. 22 illustrates the simplified showing of the diode network.

Figure 13:
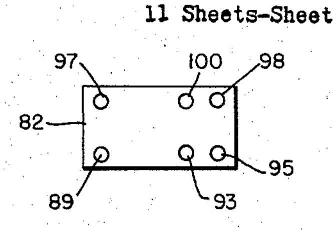

Various types of tube circuits are indicated by blocks in the master diagram, Figs. 1*a* to 1*g*. These circuits will be described now in greater detail. Fig. 13, for example, represents in block or rectangle form a type of double inverter unit 82. This unit is shown schematically in Fig. 14, where it is seen to comprise a twin triode amplifier 83 in which the plate 84 of the first triode is coupled through a resistor 85 and capacitor 86 to the grid 87 of the second triode. The grid 88 of the first triode is connected to an input terminal 89. The cathodes 90 and 91 have a common ground connection as shown. The grid 87 is connected through a resistor 92 to a terminal 93 and is also coupled by a capacitor 94 to a terminal 95. The plates 84 and 96 of the first and second triodes, respectively, are connected to plate terminals 97 and 98. The plate circuit of the second triode also has a tap 99 connected to a plate tap terminal 100.

Figure 14:
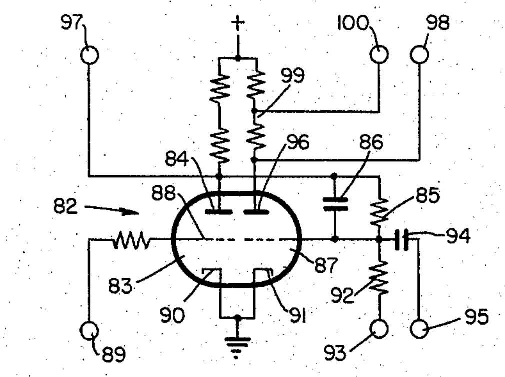

The operation of the double inverter shown in Figs. 13 and 14 is such that when a positive pulse is applied to the input terminal 89, the resulting drop of voltage at the plate 84 is communicated to the grid 87, causing a rise in voltage at the plate 96. Hence, a positive output voltage pulse is available at the terminal 98 or 100, and a negative output pulse is available at the terminal 97. As will be explained subsequently, a double inverter shown in Figs. 13 and 14 is adapted to be used in conjunction with a cathode follower to provide a latch unit. When used in this fashion, the unit is turned "on" by a positive pulse applied to the input terminal 89, and is turned "off" or reset by the application of a positive pulse to the terminal 93 or 95.

Figure 16:
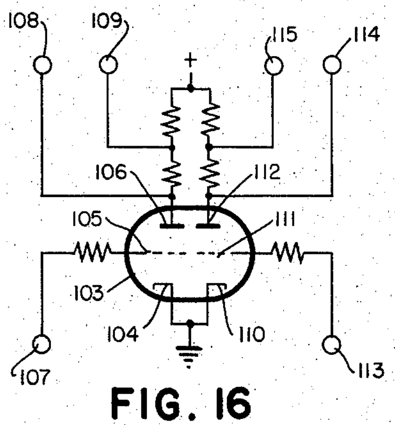
Figure 15:
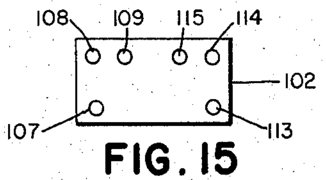
Figure 15A:
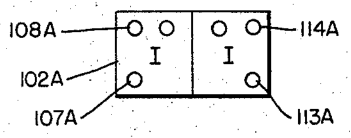

Figs. 15 and 16 illustrate another type of double inverter unit 102 comprising a twin triode 103 in which the two triode sections operate independently of each other. Thus, the triode 104—105—106 has a grid input terminal 107, a plate output terminal 108 and a plate tap terminal 109. The other triode 110—111—112 has a grid input terminal 113, a plate output terminal 114 and a plate tap terminal 115. This type of double inverter also can be employed in a latch unit, as will be explained. Since the unit shown in Fig. 16 is actually two separate inverters, it is occasionally represented herein by the symbol shown in Fig. 15*a* rather than the symbol in Fig. 15.

Figure 18:
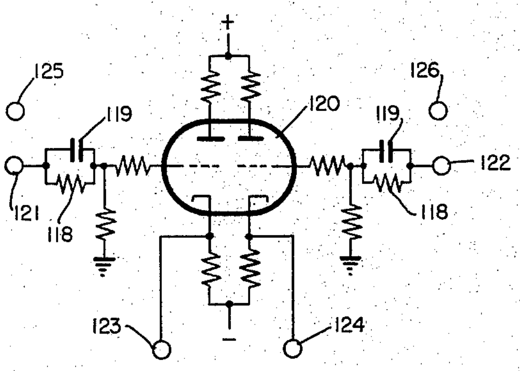
Figure 17:
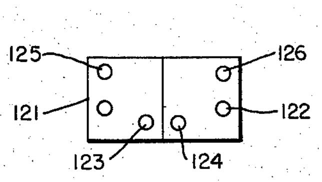

Numerous cathode followers are employed in the machine circuits, and in most instances it is found economical to utilize double units of this type. Figs. 17 and 18, for example, illustrate a double cathode follower unit utilizing a twin triode 120 having grid input terminals 121 and 122 and cathode output terminals 123 and 124. The two cathode followers of this unit operate independently of each other. Terminals 125 and 126 are not used in this type of a unit. The input resistors 118 and capacitors 119 may be omitted under some conditions.

Figure 20:
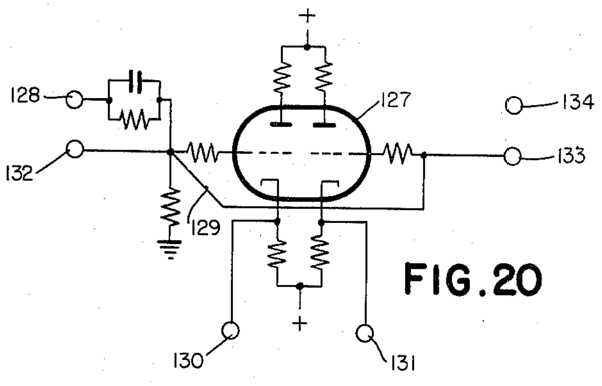

In Figs. 19 and 20 there is shown a double cathode follower unit in which the two grids of the double triode 127 are connected together by a conductor 129, and the cathode output terminals 130 and 131 usually are jumpered together, thereby connecting the two cathode followers in parallel relationship. Grid input terminals 128, 132 and 133 may be used in this unit. Terminal 134 is not used.

Figure 21:
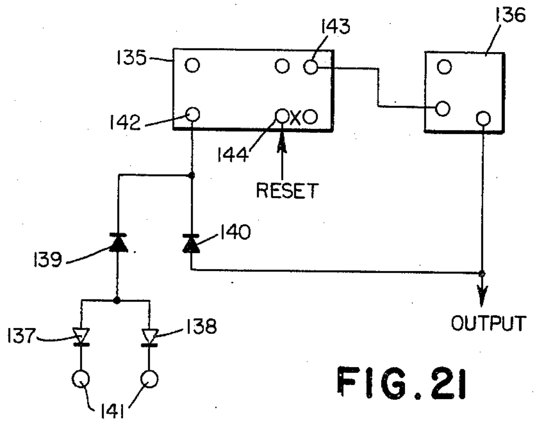
Figure 23:
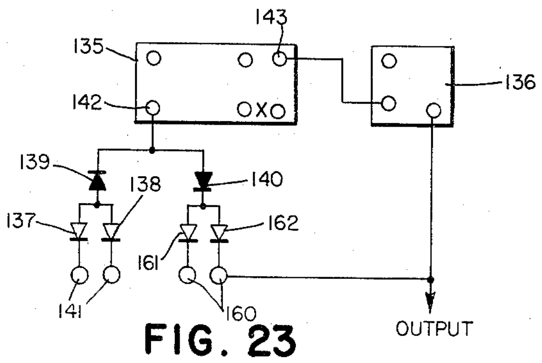

Figs. 21, 22 and 23 show various forms of latch units that are employed in the machine circuits. Certain of these latch units are disclosed and claimed in the patent to Ernest S. Hughes, Jr., No. 2,628,309, filed December 31, 1951, and issued February 10, 1953. The latch unit which is illustrated in Fig. 21 uses a double inverter 135 of the type shown in Figs. 13 and 14 above, a cathode follower 136 and a combination of diodes 137 to 140 for input and feedback purposes. In the normal "off" condition of the latch unit, the left-hand section of the double inverter 135 is cut off and the right-hand section thereof is conducting, as indicated by the "X" in Fig. 21. The application of positive pulses to the switch terminals 141 causes a positive pulse to be applied at the input terminal 142 of the double inverter 135, thereby turning the unit "on." The positive output voltage at the terminal 143 is fed back through the cathode follower 136 and the mixer diode 140 to the input terminal 142, thereby maintaining the latch unit "on." The output of the latch unit is taken from the output side of the cathode follower 136. To reset the latch unit, a positive pulse is applied to a reset terminal 144 as shown in Fig. 21, causing a negative voltage to be fed back through the cathode follower 136 and the mixer diode 140 to the input terminal 142.

Fig. 22 illustrates a type of latch unit which employs a double inverter 148 (similar to the unit shown in Figs. 15 and 16) and the two cathode followers 149 and 150. This latch unit will respond to two separate inputs, applied at different times, and will furnish two different outputs. The application of a positive input pulse to the grid terminal 151 causes a positive output voltage from the plate terminal 152 to be fed back through the cathode follower 150 and mixer diode 153 to the terminal 151. Conversely, the application of the positive input pulse to the grid terminal 154 causes a positive output voltage at the plate terminal 155 to be fed back through the cathode follower 149 and mixer diode 156 to the terminal 154.

The latch unit illustrated in Fig. 23 is similar to that shown in Fig. 21 except that the latching action depends upon the coincidence of positive voltages at input terminals 160. One of these coincident voltages, of course, is the positive output furnished by the cathode follower 136 when the double inverter 135 is "on." The other coincidence voltage is supplied by a source which controls the latching action. So long as the switch diodes 161 and 162 are energized by these coincident positive voltages, the double inverter 135 is latched in its "on" condition, but when the coincidence is destroyed, the unit is immediately turned "off." It is not necessary to supply a separate reset pulse for this purpose.

Figure 24:
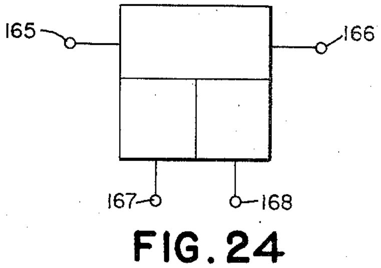

In Fig. 24 there is shown a more general block representation of a latch unit. Terminal 165 indicates an input for the purpose of turning the latch on, terminal 166 indicates a terminal through which a pulse is introduced to turn the latch off, terminal 167 indicates the terminal through which the output from the "on" side of the latch is taken, and terminal 168 indicates the terminals through which the output from the "off" side of the latch is taken.

*Storage systems*

Figure 1A:
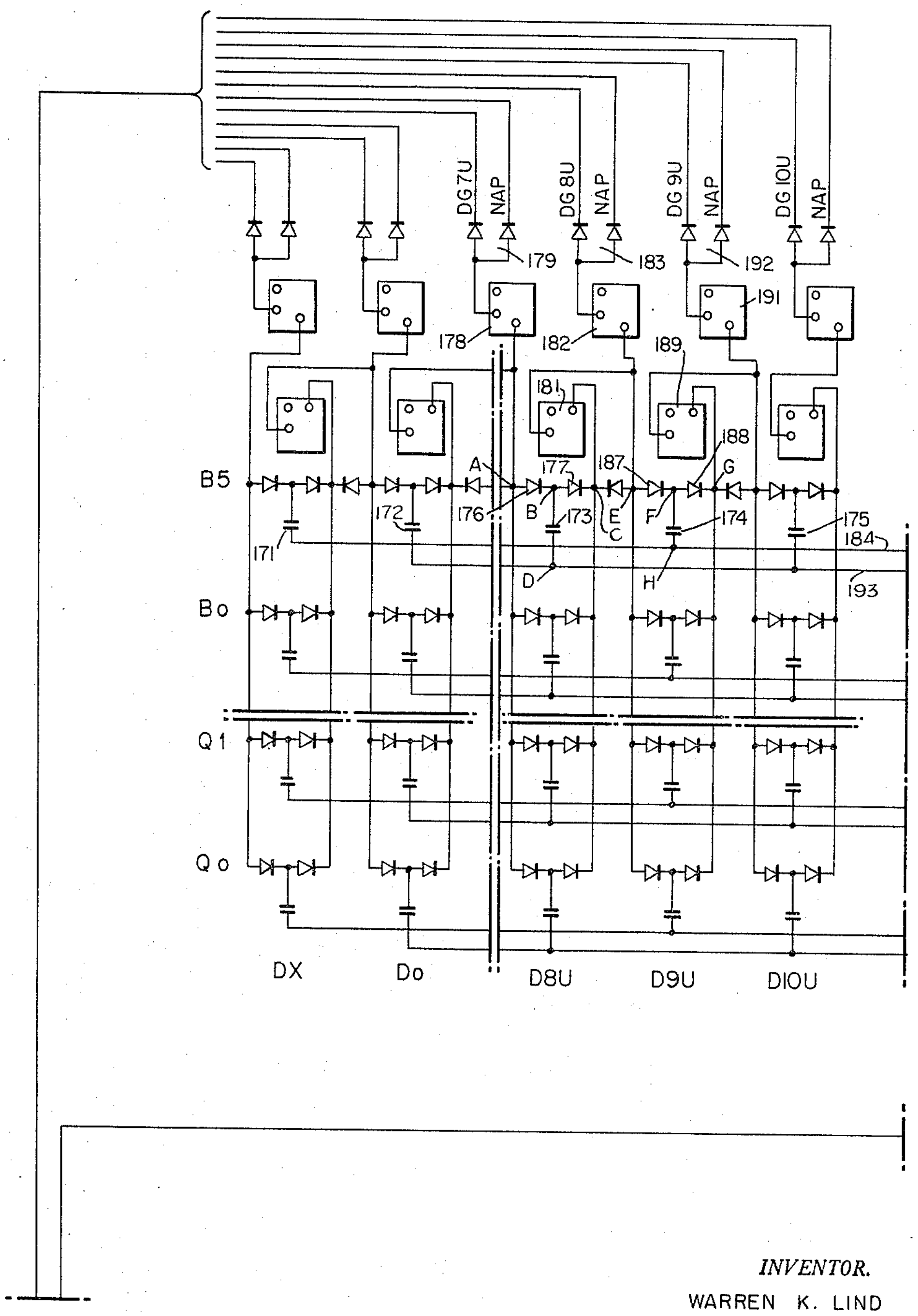
Figure 1B:
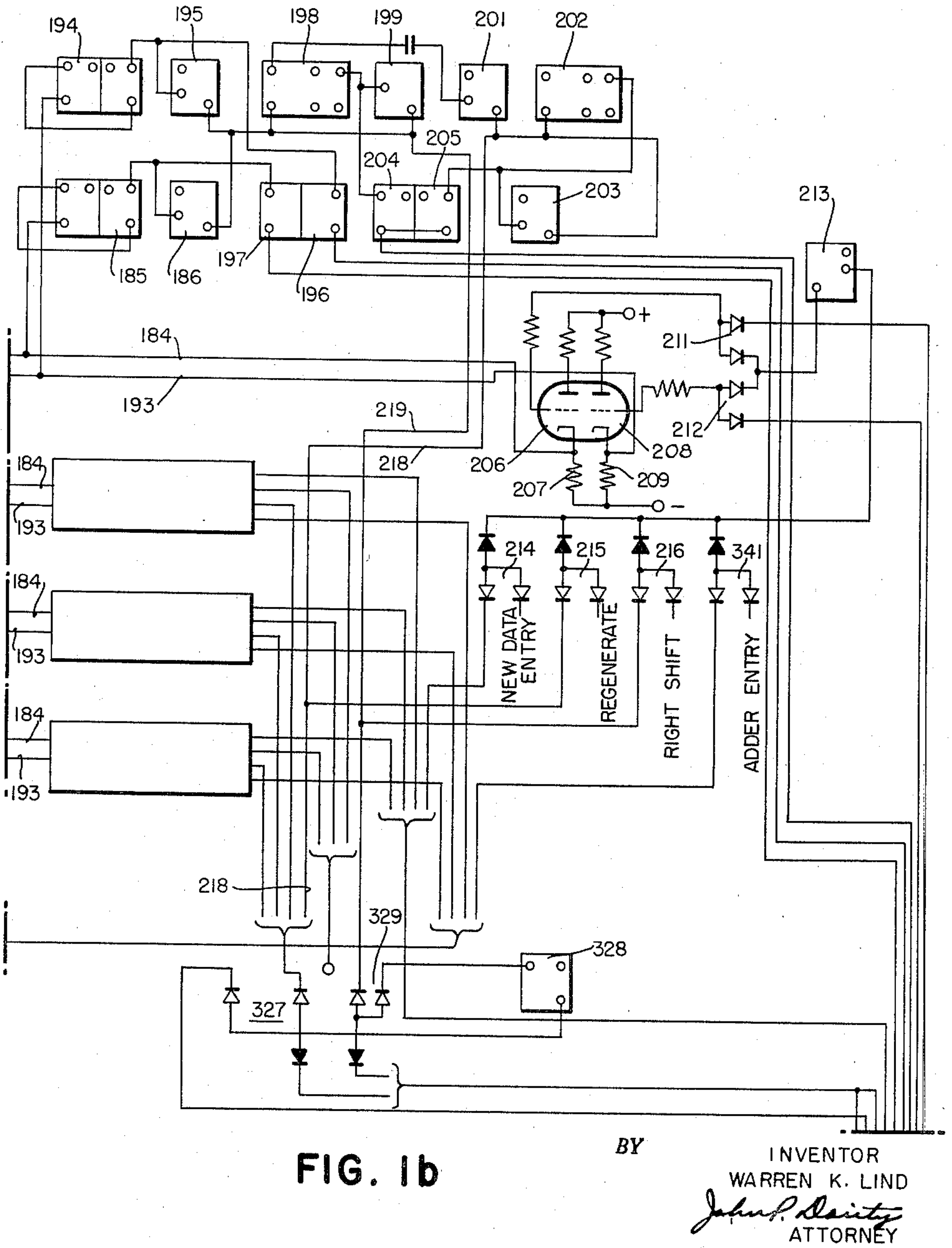

Referring to Figs. 1*a* and 1*b* a storage system is shown comprising a matrix arrangement of a number of condenser storage units and associated latch circuits. This matrix is adapted to handle data represented in the biquinary code, thus there are seven rows or levels of condenser storage elements designated B5, B0, and Q4 through Q0, respectively. The present matrix has been chosen to store 22 digits, and accordingly 22 columns of condenser storage elements are provided respectively designated DX, D0, D1L, D2L, D3L, and so on, through D10L (digit 10 lower) and D1U, D2U, and so on, through D10U (digit 10 upper). The condenser storage matrix is considered to be broken into two portions and it has been chosen to designate the two portions, the lower and the upper accumulators respectively. The lower accumulator has 12 digit positions or orders and the upper accumulator has 10 digit positions or orders, the DX and D0 positions being assigned normally to the lower.

In order to understand the operation of the matrix as a whole, single units will be first considered. In Fig. 1*a* the B5 level of the matrix comprises 22 condenser storage elements. These condenser storage elements include the condensers 171, 172, 173, 174 and 175. Each of these condensers is adapted to assume two stable states, namely, a charged state and an uncharged state. A condenser in the uncharged state is considered to have a "bit" stored therein and a condenser in the charged state is considered to have no "bit" stored therein. It is apparent that the opposite arrangement might equally as well have been chosen. Each condenser may thus be considered a binary element. Associated with condenser 173 are two rectifiers or diodes 176 and 177. The cathode of diode 176 is connected to the plate of diode 177 and the junction of the two diodes is connected to one side of condenser 173 at point B. The plate of diode 176 is connected at point A to the output of a cathode follower 178. The input to cathode follower 178 is connected to the output of a switch 179. The cathode of diode 177 is connected at point C to the output of an inverter amplifier 181. The input to inverter 181 is taken from the output of a cathode follower 182 and the input to cathode follower 182 is taken from a switch 183.

The opposite side of condenser 173 is connected to the line 193 at point D. Line 193 is connected to the input of a double inverter amplifier 194 and the output of amplifier 194 is connected to the input of a cathode follower 195.

Condenser 174 of the B5 level has associated therewith diodes 187 and 188. The cathode of diode 187 is connected to the anode of diode 188 and the junction of the two diodes is connected to one side of condenser 174 at point F. The anode of diode 187 is connected at point E to the output of cathode follower 182. The cathode of diode 188 is connected at point G to the output of an amplifier inverter 189. The input of inverter 189 is connected to the output of a cathode follower 191 and the input to cathode follower 191 is connected to the output of a switch 192. The opposite side of condenser 174 is connected at point H to a line 184. Line 184 is connected to the input of a double inverter amplifier 185 and the output from amplifier 185 is connected to the input of a cathode follower 186. The input to cathode follower 195 is also connected to the output of an inverter amplifier 196 and the input to cathode follower 186 is additionally connected to the output of an inverter amplifier 197.

The outputs of cathode followers 186 and 195 are connected together and connected to the input of a double inverter 198 as described above in relation to Figs. 13 and 14. The output of the double inverter 198 is connected to the input of a cathode follower 199. The output of cathode follower 199 is connected back to the input of the double inverter 198 to form a latch circuit. The plate of the first inverter tube of double inverter 198 is capacitively coupled to the input of a cathode follower 201. The output of cathode follower 201 is connected to the input of a double inverter 202 and the output of double inverter 202 is connected to the input of a cathode follower 203. The output of cathode follower 203 is connected back to the input to double inverter 202 to form a second latch circuit. The input to cathode follower 199 is also connected to the output of an inverter 204. The input to cathode follower 203 is likewise connected to the output of an inverter 205. The inputs to inverters 204 and 205 are connected together so that the output voltages from the two may be identical.

Line 184 is also connected to the output of a cathode follower 206 having a cathode resistor 207 connected to a negative voltage source, not shown. Line 193 is likewise also connected to the output of a cathode follower 208 having a cathode resistor 209 connected to the negative voltage source, not shown. The input to cathode follower 206 is taken from the output of a switch 211 and the input to cathode follower 208 is taken from the output of a switch 212. One side of switch 211 is connected to one side of switch 212 and the junction is connected to the output of a cathode follower 213. The outputs of switches 214, 215, 216 and 217 are mixed and fed to the input of cathode follower 213. The output of cathode follower 199 is connected to one side of switch 216 and the output of cathode follower 203 is connected to one side of switch 215.

In operation, if a condenser is required to remain in the charged state for any appreciable length of time the charge must be periodically regenerated thereon and if a condenser is to remain in the uncharged state for an appreciable length of time it is desirable to periodically remove any charge accumulated thereon to insure the maintenance of the original condition.

Figure 3:
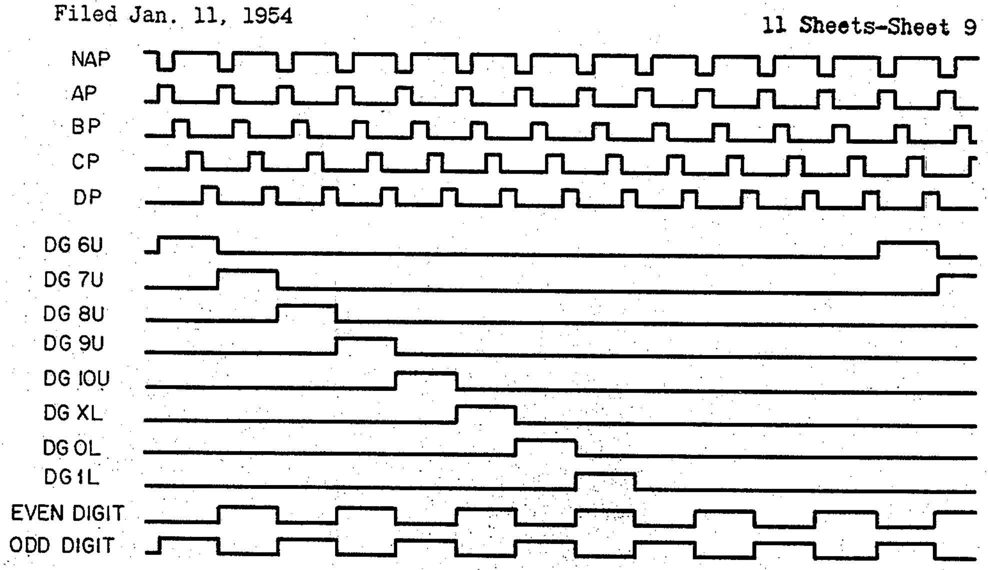
Fig. 3 is a timing diagram showing the relationship of various timing pulses used by the machine.

Assume that initially condenser 173 has no charge thereon and that it is desired to regenerate this state of the condenser and to convey a signal indicating the presence of a "bit" in the condenser. A DG7U (digit gate 7 upper) pulse is switched with an NAP (negative "A" pulse) at switch 179 to produce a gate pulse at digit 7 upper time, extending from "B" time of digit 7 to "A" time of digit 8 upper, at the input of cathode follower 178. These pulses are generated as indicated above and may be seen in schematic form at DG7U and NAP, respectively, in Fig. 3.

The output from cathode follower 178 raises the point "A" and thus the anode of diode 176 for a duration of time from "B" time of digit 7 to "A" time of digit 8. It should be noted that the points "A" and "D" are normally biased at the same negative potential and that the point "C" is normally biased at a positive potential. When the point "A" is raised in potential diode 176 conducts and raised point "B" in potential. The rise in potential at point "B" is reflected across condenser 173 to point "D." The rise in potential at point "D" causes a current to flow through resistor 209 at the cathode of cathode follower 208 to charge condenser 173. The rise in potential at point "D" and thus the rise in potential of line 193 causes an amplified output signal from amplifier 194 and an input signal to be fed to cathode follower 195. In response to this signal, or the line 193 going positive, a positive output is produced from cathode follower 195 to turn the latch including double inverter 198 and cathode follower 199 to the "on" condition. This latch will be referred to hereinafter as the "early" latch. The early latch remains on until "A" time of the digit 8 upper pulse at which time it is turned off by the output from inverter 204. An AP (A pulse) is fed to the input of inverter 204 to cause a negative voltage to be produced at its output, thereby lowering the potential on the grid of cathode follower 199 to turn the early latch off. As the early latch goes off a positive going signal is produced at the plate of the first tube of the double inverter 198 and this positive going pulse is capacitively coupled to the input of cathode follower 201 to cause a positive going output pulse to be produced. This positive going output pulse is fed to the input of double inverter 202 to cause a positive output pulse from inverter 202. This positive output pulse is fed to the input of cathode follower 203 to cause a positive output voltage to be fed back to the input of double inverter 202. Thus, the latch including double inverter 202 and cathode follower 203 is turned on at "A" time of digit 8 upper. This latch will be referred to hereinafter as the "on time" latch. The on time latch will remain on until "A" time of digit 9 upper, even though an "A" pulse is applied to the input of inverter 205 and a negative going output is taken from inverter 205 and supplied to the input of cathode follower 203 at the same time that the positive going output from double inverter 202 is supplied to the input.

Line 218 from the output of cathode follower 203 is thus provided with a positive pulse during digit 8 upper time in response to a bit being stored in the digit 8 upper position of the condenser storage matrix. Line 218 or the output of cathode follower 203 is connected to one side of switch 215. Since it is desired to regenerate the condition or state of no charge on condenser 173 the other side of switch 215 is provided with a voltage gate to allow the digit gate 8 upper pulse appearing on line 218 to be fed to the input of cathode follower 213.

At the beginning of digit 8 upper time the DG7U pulse at switch 179 was removed, therefore the cathode follower 178 ceased to conduct and the point "A" returned to the normal negative condition and diode 176 no longer can conduct. During the "A" pulse of digit 8 upper point "C" remains at a positive potential while point "D" is at the negative potential since condenser 173 charged during digit 7 upper time. Point "B" is thus at a positive potential and diode 177 does not conduct appreciably. A DG8U pulse and an AP are switched at switch 183 and the resultant pulse extending from "B" time of digit 8 to "A" time of digit 9 is fed to the input of cathode follower 182. The output of cathode follower 182 is fed to the input of inverter 181 causing a negative going pulse to be produced at the output of inverter 181. The output pulse from inverter 181 goes from the positive potential to zero potential and thus point "C" goes to zero potential and diode 177 conducts since point "B" is at a positive potential. The positive going input extending from "B" time of digit 8 upper to "A" time of digit 9 upper supplied to cathode follower 213 is switched at switch 212 with an even digit pulse and the resultant positive going output pulse from "B" time of digit 8 to "A" time of digit 9 is supplied to the input of cathode follower 208. This positive going voltage at the input of cathode follower 208 causes a voltage drop across resistor 209 and thus a positive going pulse from "B" time of digit 8 upper to "A" time of digit 9 upper to be supplied over line 193 to point "D." The rise in potential at point "D" is reflected across condenser 173 to point "B" at the same instant of time that point "C" drops from the positive potential level to the zero potential level, thus, diode 177 conducts to discharge condenser 173. The drop across resistor 209 was of such magnitude as to cause line 193 to go to zero potential approximately. Thus, the bit stored in condenser 173 has been regenerated or the no charge state of condenser 173 has been maintained and an indication has been read out that a bit was stored by the condenser.

Assume that initially condenser 174 has a charge thereon or is in the charged state indicating the absence of a "bit." Also during the interval from "B" time of digit 8 upper to "A" time of digit 9 upper the positive going output from cathode follower 182 was supplied to point E and thus to the anode of diode 187. The point "E" thus went from the negative potential to the zero potential level. Since condenser 174 was initially charged, the point F is at approximately zero potential if none of the charge leaks from the condenser 174. If no charge has leaked from condenser 174 then diode 187 will not conduct appreciably, however, if some of the charge has leaked from condenser 174 diode 187 will conduct to bring the condenser back to its original charged state. The raising of point "E" to the zero potential level does not cause an appreciable signal or voltage rise to take place at point "H" and thus no appreciable signal will be fed over line 184 to the input of the double inverter 185. Thus, there will be no output from cathode follower 186 and the early latch will not be turned on during digit 8 upper time. Since the early latch is not turned on during digit 8 upper time no signal will be fed to cathode follower 201 during digit 9 upper time and the on time latch will not be turned on. Therefore, no signal will appear on line 218 during digit 9 upper time and no input will be supplied to cathode follower 213. No output can therefore come from switch 211 to cause cathode follower 206 to conduct. Line 184 is therefore not raised in potential during digit 9 upper time and the point "H" remains at the negative potential level. A DG9U pulse and an NAP are switched at switch 192 to provide a positive going input to cathode follower 191. The output of cathode follower 191 is taken to the input of inverter 189. The output of inverter 189 is supplied to point "G" to lower point "G" in potential to approximately the zero level. Since the point "F" remains at zero potential in the absence of a positive pulse on line 184 then diode 188 does not conduct to discharge condenser 174 and the charge has thereby been regenerated on condenser 174, or, its initial state has been restored. During digit 8 upper time, as explained above, no pulse appeared on line 218, therefore, the absence of an output from the condenser storage matrix indicates that condenser 174 was in a charged state or that no bit was stored in the binary 5 level of the digit 9 upper portion of the condenser matrix. It is to be noted that the inverter 197 has an odd digit pulse supplied thereto and the input of the inverter 196 has an even digit pulse supplied thereto. Since the output of inverter 197 is connected to the input of cathode follower 186, it is not possible for an output pulse to be produced from cathode follower 186 during odd digit time and thus a signal appearing on line 184 at odd digit time in response to cathode follower 206 conducting cannot be transmitted to the input of double inverter 198 to turn the early latch on. Likewise the output of inverter 196 is supplied to the input of cathode follower 195 to insure that the early latch is not turned on in response to a signal produced at the output of cathode follower 208 and appearing on line 193 during even digit time.

It will be noted that the binary 5 level of digit 9 upper order of the condenser storage matrix has been read out of simultaneously with the regeneration of the binary 5 level of the DG8 upper order of the matrix.

Assume that it is desired to read the information out of the condenser storage matrix and to replace it with new information. Information from an outside source may be introduced through either switch 214 or switch 217. Assume again that condenser 173 is uncharged and condenser 174 is in the charged state. A DG7U pulse is switched with an NAP pulse at switch 179 and the resultant pulse is supplied to the input of cathode follower 178 to produce at its output a positive going pulse from B time of digit 7 upper to "A" time of digit 8 upper. Point "A" is raised in potential and diode 176 conducts to charge condenser 173 through resistor 209. Condenser 173 will become charged before "A" time of digit 8 upper and point "D" will thus have return to the negative potential level before "A" time of digit 8 upper. As explained above the early latch is turned on at "B" time of digit 7 upper and remains on until "A" time of digit 8 upper at which time it is turned off by the "A" pulse supplied to the input of inverter 204 and from the output of inverter 204 to the input of cathode follower 199. As the early latch goes off a positive going signal is produced at the input of cathode follower 201 and a positive signal is produced at the output of cathode follower 201 to turn the on time latch on at "B" time of digit 8 upper. The on time latch will remain on until turned off by the "A" pulse supplied to the input of inverter 205 which causes a negative going output signal from inverter 205 to be applied to the input of cathode follower 203. A positive going pulse is thus produced on line 218 from "B" time of digit 8 upper to "A" time of digit 9 upper in response to the condenser 173 having no charge thereon. This signal may be conveyed over line 218 to indicate the initial no charge condition of condenser 173.

Since it is desired to introduce new information into the condenser storage matrix a positive going signal will be applied to one side of switch 214 and the new information will be brought in on the other side of switch 214. Digit 8 will be brought in at digit 8 upper time and if digit 8 requires that no bit be stored at the binary 5 level of digit 8 upper order of the condenser storage matrix then no signal will be produced at the output of switch 214. Since a read in of new information is called for the switch 215 will have no signal indicating a regeneration operation applied thereto. Thus no input signal is provided at cathode follower 213 and no output signal is produced from cathode follower 213 to be mixed with the even digit pulse at switch 212. Thus no input is provided for cathode follower 208 and no voltage drop takes place across resistor 209 and line 193 thus remains at the negative potential level. A DG8U pulse is switched with an NAP at switch 183 to produce a positive going input to cathode follower 182 thus causing a positive going output from cathode follower 182 to produce a positive going input to inverter 181. This produces a negative going output from inverter 181 extending from "B" time of digit 8 upper to "A" time of digit 9 upper which causes point "C" to drop in potential to the zero level.

Since point B is at zero potential in the absence of a positive going voltage pulse on line 193 then diode 177 does not conduct to discharge condenser 173 and the charge remains thereon to indicate the absence of a bit stored at the binary 5 level of DG8 upper order of the condenser storage matrix. The positive going output from cathode follower 182 extending from "B" time of digit 8 upper to "A" time of digit 9 upper is also applied to point "E" to cause the charge on condenser 174 to be brought to its initial level if it had previously partially leaked off. This causes no appreciable rise in voltage at point "H" and thus no appreciable signal is applied to the input of the double inverter 185. No output is taken from double inverter 185 to the input of cathode follower 186 and thus the early latch is not turned on. Since the early latch is not turned on, the on time latch will not be turned on during digit 9 upper time. Since the on time latch was not turned on during digit 9 upper time, no signal will appear on line 218 and the absence of this signal indicates that no bit was stored in the binary level of digit 9 upper order of the condenser storage matrix and this information may be conveyed as desired to indicate this fact. Since the operation calls for the reading into the condenser storage matrix of new information, no signal is applied to switch 215. Assume that the new information contains a bit in the binary 5 level of the digit 9 upper, then a positive going signal will appear during digit 9 upper time on one side of switch 214 and be switched with the "read in" signal appearing on the other side of the switch 214 to produce a positive going signal at the input of cathode follower 213 at DG9 upper time. At DG9 upper time the odd digit pulse is applied to one side of switch 211 and the other side of switch 211 has applied thereto the output of cathode follower 213 which, in this instance, is a positive going pulse as a result of the new information being switched at switch 214 to the cathode follower 213. At digit 9 upper time the input to cathode follower 206 is a positive going signal and thus a drop will be produced across resistor 207 to raise line 184 in potential. This raises point "H" in potential and the rise in potential is reflected across condenser 174 to the point "F." At "B" time of digit 9 upper, point "G" will drop in potential from the positive potential level to zero potential, and, since point "F" rose in potential from the zero level to the positive level as a result of point "H" rising from the minus potential level to the zero potential level, diode 188 will conduct to discharge condenser 174. Thus a bit has been read into the binary 5 level of the digit 9 upper order of the condenser storage matrix to replace the no bit condition existing prior thereto. It is to be noted that the information previously standing in the binary 5 level of the digit 9 upper order of the condenser storage matrix has been read out simultaneously with the entry of new information into the binary 5 level of digit 8 upper order of the condenser storage matrix.

All the orders of the condenser storage matrix operate in a manner similar to that described above and will therefore be described in no further detail here.

Each of the levels of an order of the condenser storage matrix are connected in parallel with the others of that order, so that the entry, or readout from the 7 levels of an order is parallel.

Each of the levels, the B0, Q4, Q3, Q2, Q1 and Q0, operates in the identical manner as the B5 level, and the part of the circuitry associated with these last 6 levels is shown in block form since it is identical with the circuitry associated with the B5 level.

If it is desired to shift the information stored in the condenser storage matrix one position to the left it is merely necessary to take the output from the early latch over line 219 and switch it at switch 216 with a positive going voltage pulse supplied when it is desired to shift the information to the left. This may be accomplished as follows: Assume that condenser 174 is initially discharged. At "B" time of the DG8 upper pulse a signal will be produced on line 184 to turn the early latch on. As the early latch goes on line 219 rises in potential and this rise in potential is switched at switch 216 with a left shift pulse and supplied to the input of cathode follower 213. At DG8 upper time there is supplied to one side of switch 212 an even pulse. The other side of switch 212 is connected to the output of cathode follower 213 and thus from "B" time of digit 8 upper until "A" time of digit 9 upper a positive potential is supplied to the input of cathode follower 206 to produce a positive pulse for the same duration of time on the line 193. The positive pulse on line 193 raises the potential at point "D" and thus the potential of point "B." Prior to the above, assuming that there was initially a charge on condenser 173, at "B" time of digit 7 upper, point "A" was raised in potential to charge condenser 173 to the predetermined level. The rise in potential at "D" causes condenser 173 to be discharged during the interval from "B" time of digit 8 upper to "A" time of digit 9 upper, and thus condenser 173 has no charge stored thereon. It is seen that this is the condition initially of condenser 174, and that the condition of condenser 174 has been transferred to condenser 173. The information contained at the binary 5 level of the digit 9 upper order of the condenser storage matrix has been transferred to the binary 5 level of the digit 8 upper order of the condenser storage matrix, or, in other words, has been shifted left one order.

The accumulator is capable of having a word stored in its lower portion or of having a word stored in its upper portion, and either may be regenerated in the accumulator as long as is desired. Alternately, the accumulator may have information entered into or read from it, or may have the information standing therein shifted to the left. It is also seen that information may be read from the accumulator at the same time that the information is regenerated therein. The accumulator may also have information read therefrom at the same time that new information is being entered into the same level.

Figure 1C:
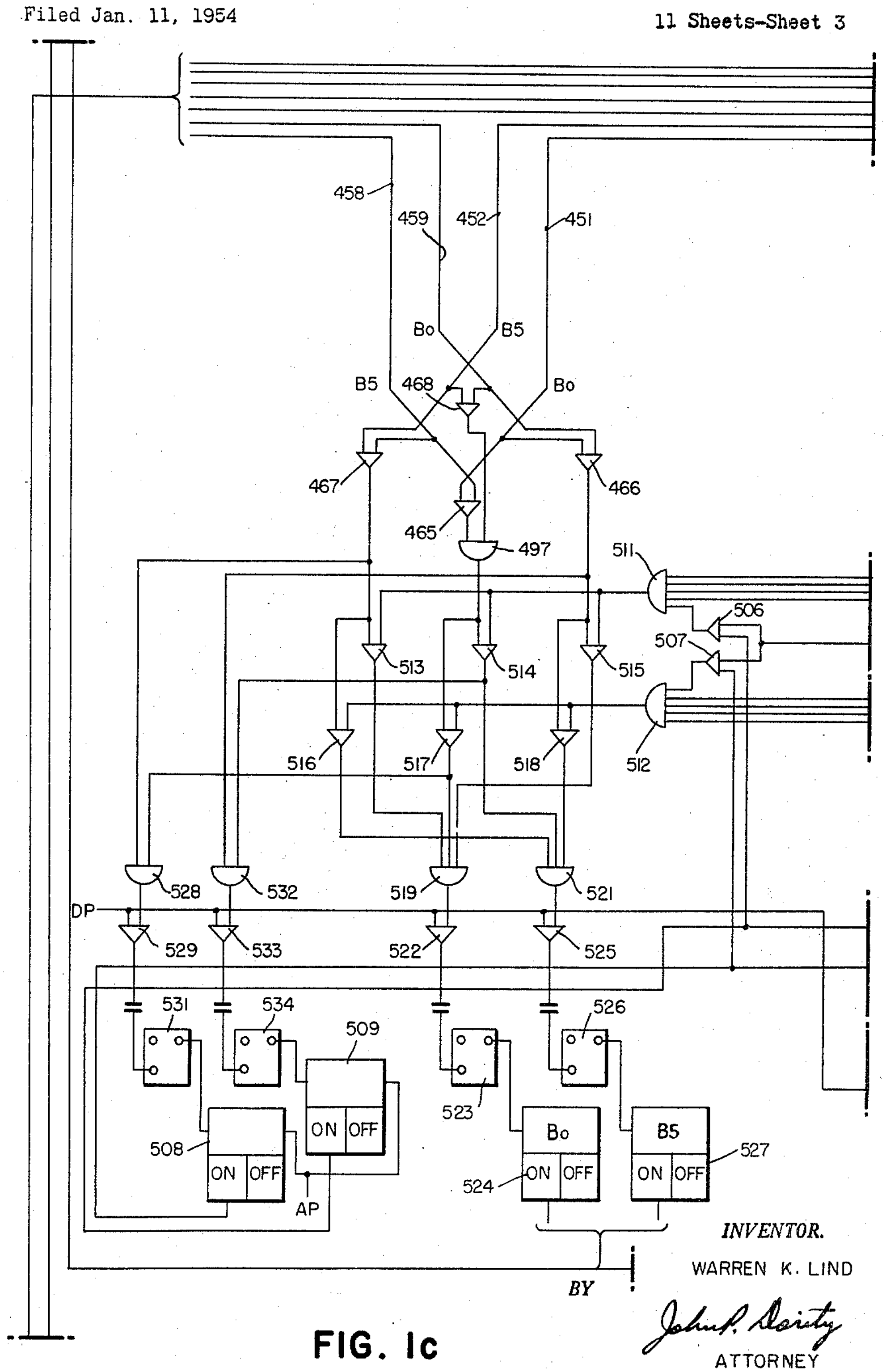
Figure 1F:
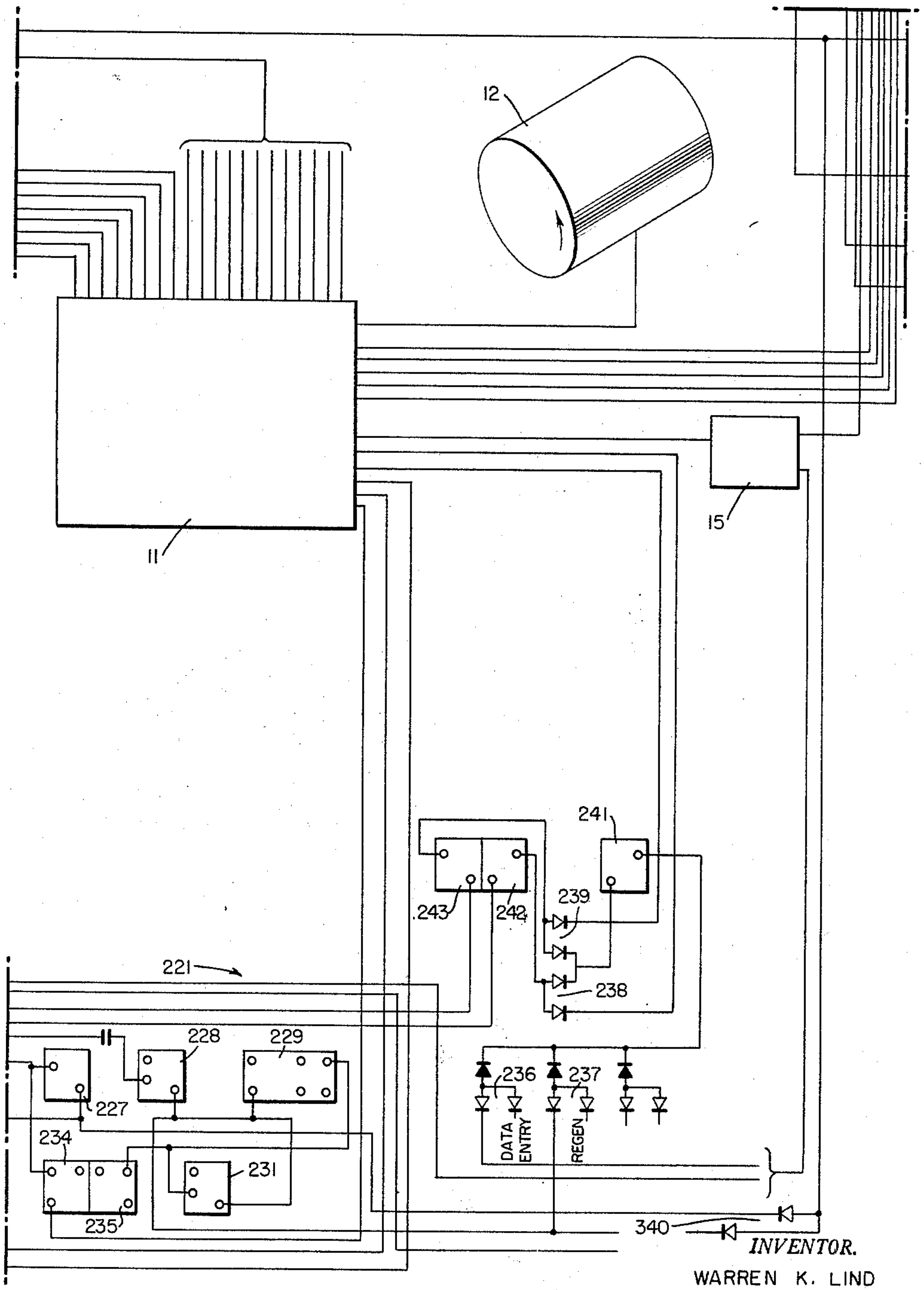
Figure 1G:
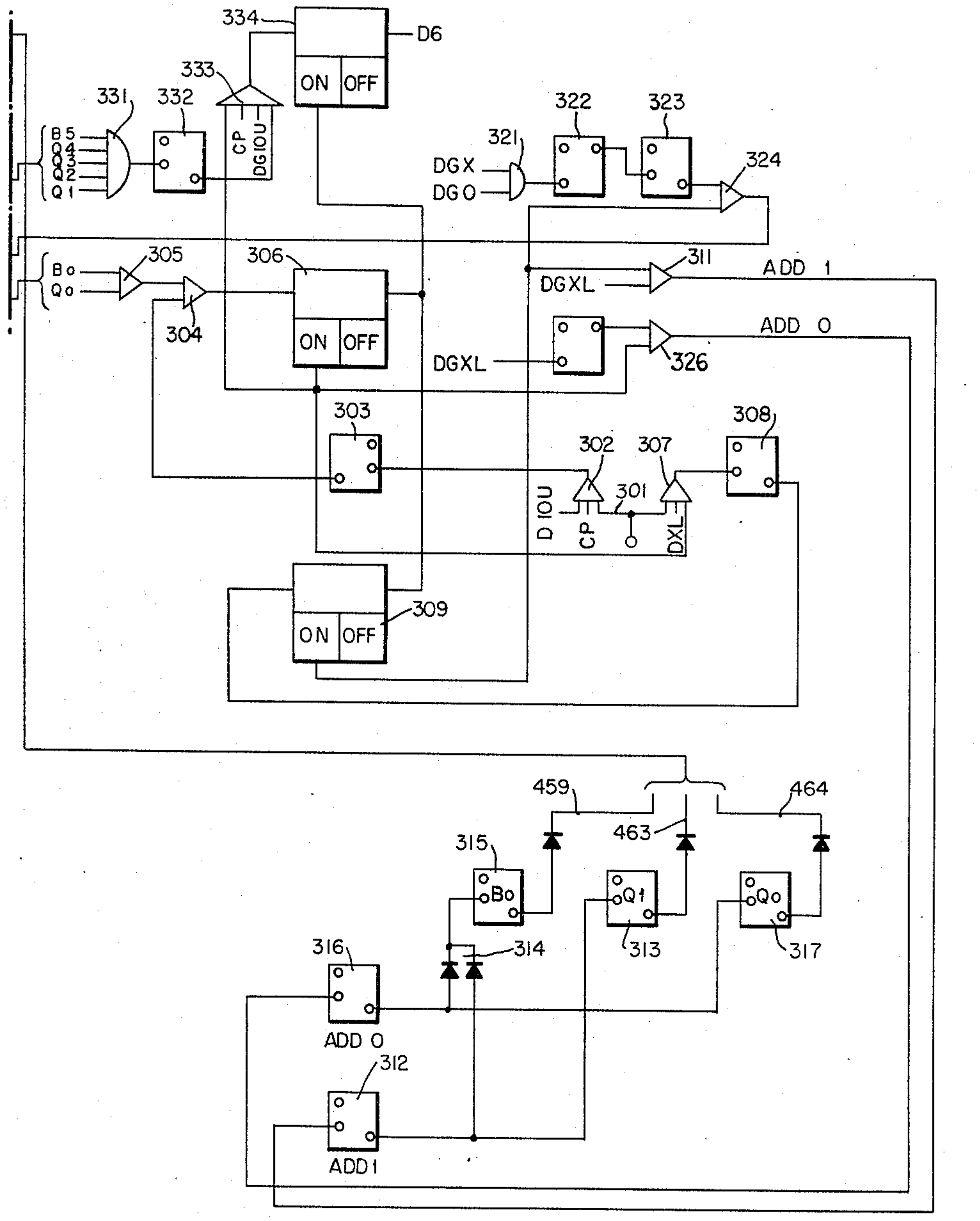
Figure 1D:
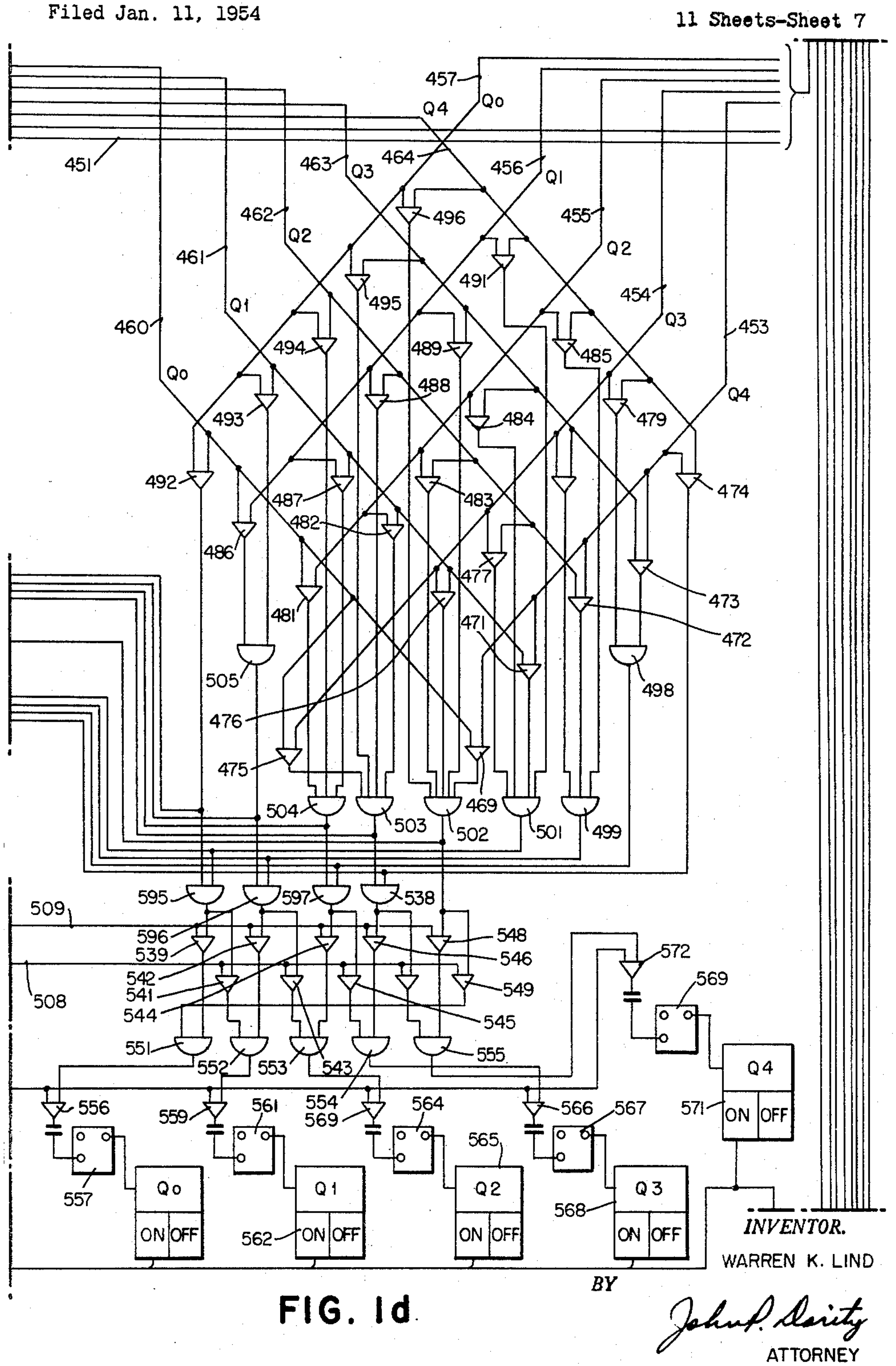
Figure 1E:
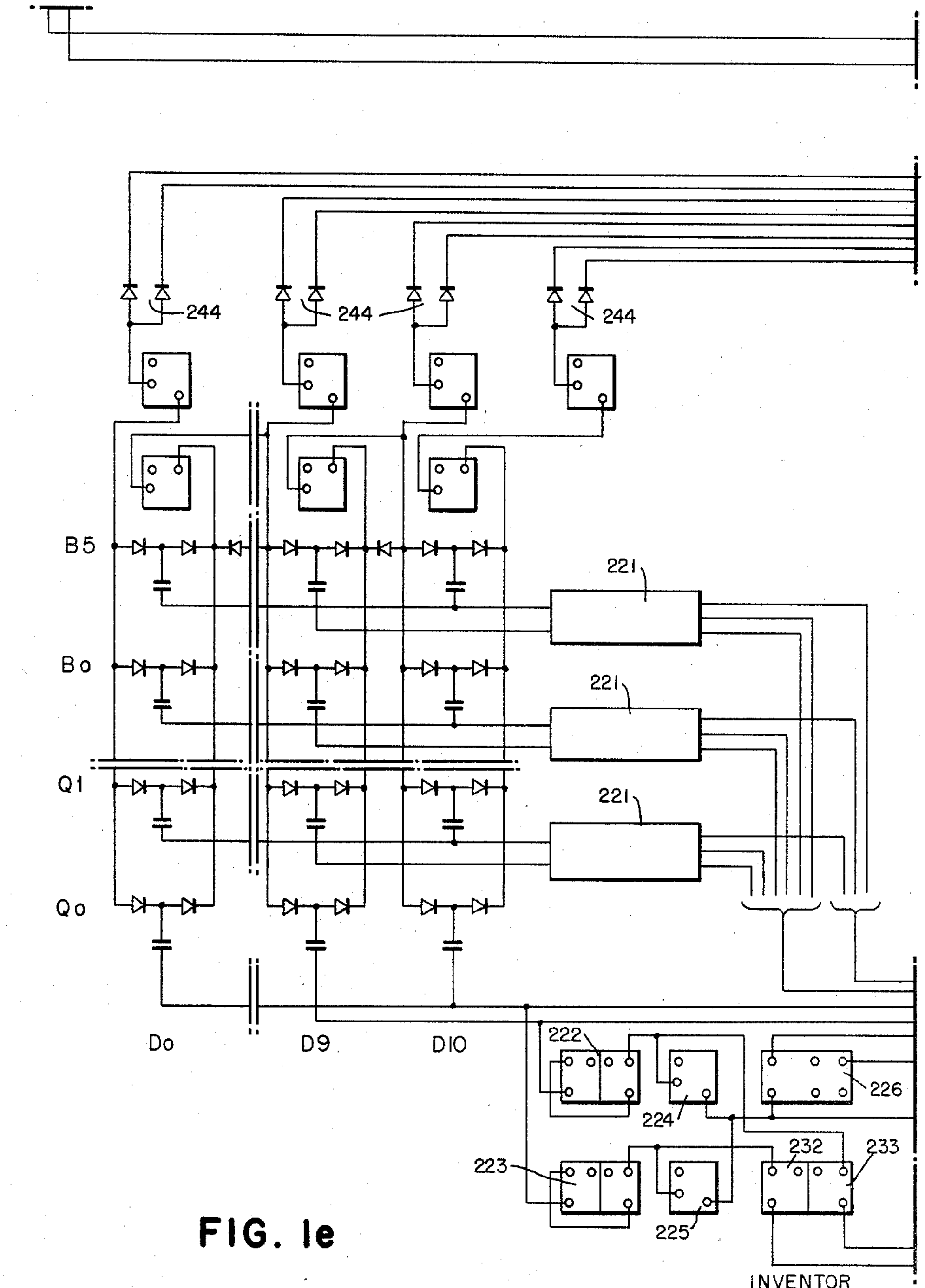

The auxiliary storage system shown in Figs. 1*e* and 1*f* is made up of a condenser storage matrix similar to that of the storage system shown in Figs. 1*a* and 1*b* and the details will therefore not be described again. This storage system has only 11 digit positions, or orders, designated D0, D1, D2, and so on, through D10. Each order of the auxiliary storage system like that of the storage system described above has seven levels designated B5, B0, Q4, and so on, through Q0. Each level of the distributor has regeneration circuitry, entry circuitry and readout circuitry similar to that described with the exception that the auxiliary storage system is provided with but one switch through which new information may be inserted and but one regeneration path. This circuitry is indicated generally at 221 thus, the information in the condenser storage matrix of the auxiliary storage system may not be shifted to the left. Each level of the auxiliary storage system includes a double inverter amplifier 222 and a double inverter amplifier 223, a cathode follower 224 and a cathode follower 225, an early latch including the double inverter 226 and cathode follower 227, a capacitively coupled cathode follower 228, an on time latch including the double inverter 229 and the cathode follower 231, an inverter 232, an inverter 233, an inverter 234, an inverter 235, a switch 236, a switch 237, a switch 238, a switch 239, a cathode follower 241, a cathode follower 242, and a cathode follower 243. The distributor is provided with the switches 244 for introducing the necessary timing pulses into the several orders of the auxiliary storage system. The auxiliary storage system is capable of having information read from one order simultaneously with having new information, or regenerated information, entered into an adjacent order.

*The adder*

The adder is a one digit matrix adder in that it includes a grid arrangement of switching elements and is adapted to add but one digit at a time. Two streams of information are fed to the adder simultaneously, and merged, or added, and the output is taken as a single stream of information representing the sum of the two input streams. The present adder is adapted to handle information represented in the biquinary code and thus has two sets of inputs of seven lines each and a single output of seven lines.

Referring to Figs. 1*c* and 1*d* the adder is shown having lines 451 through 457 representing the levels B0, B5, Q4, Q3, Q2, Q1 and Q0 respectively, entering, one side of a matrix of switching elements. This entry may be termed the "A" entry. Lines 458 through 464 representing the levels B5, B0, Q0, Q1, Q2, Q3, and Q4, respectively, enter a second side of the matrix of switching elements. This entry may be termed the "B" entry. Line 451 is switched with line 458 at switch 465, line 451 with line 459 at switch 466, line 452 with line 458 at switch 467, line 452 with line 459 at switch 468, line 453 with line 460 at switch 469, line 453 with line 461 at switch 471, line 453 with line 462, at switch 472, 453 with 463 at switch 473, 453 with 464 at switch 474, line 454 with line 460 at switch 475, line 454 with line 61 at switch 476, line 454 with line 462 at switch 477, line 454 with line 463 at switch 478, line 454 with line 464 at switch 479, line 455 with line 460 at switch 481, line 455 with line 461 at switch 482, line 455 with line 462 at switch 483, line 455 with line 463 at switch 484, line 455 with line 464 at switch 485, line 456 with line 460 at switch 486, line 456 with line 461 at switch 487, line 456 with line 462 at switch 488, line 456 with line 463 at switch 489, line 456 with line 464 at switch 491, line 457 with line 460 at switch 492, line 457 with line 461 at switch 493, line 457 with line 462 at switch 494, line 457 with line 463 at switch 495, and line 457 is switched with line 464 at switch 496.

The output of switches 465 and 468 are respectively mixed at mixer 497. The outputs of switches 473 and 479 are respectively mixed at mixer 498. The outputs of switches 485, 472, and 478 are respectively mixed at mixer 499. The output of switches 471, 477, 484, and 491 are respectively mixed at mixer 501. The outputs of switches 469, 476, 483, 489, and 496 are respectively mixed at mixer 502. The outputs of switches 475, 482, 488, and 495 are respectively mixed at mixer 503. The outputs of switches 481, 487, and 494 are respectively mixed at mixer 504. And the outputs of switches 486 and 493 are respectively mixed at mixer 505.

Thus, for example, a binary 5 on line 458 switched with a binary 5 on line 452 produces an output from switch 467. A binary 0 on line 459 switched with a binary 0 on line 451 produces an output from switch 466. An output from either switches 466 or 467 indicates a zero in the binary level since only one digit is added at one time and a binary 5 added to a binary 5 give an output of 10 which is a zero in the digit position being added and a carry to the next higher order digit position. Likewise the addition of a quinary 2 and a quinary 4, a quinary 4 and a quinary 2, and a quinary 3 and a quinary 3 each give a quinary 1 sum in the quinary level of the digit position being added with a carry to the binary level required during the same digit.

The output from mixer 502 is switched as switch 506 with the output from the "on" side of a latch 508. The output from mixer 502 is also switched as switch 507 and the output from the "on" side of a latch 509. The manner in which latches 508 and 509 are turned "on" and "off" will be explained presently. The outputs from switch 492, switch 506, mixer 505, mixer 504, and mixer 503 are respectively mixed at mixer 511. The outputs from switch 474, switch 507, mixer 498, mixer 499, and mixer 501 are respectively mixed at mixer 512. An output from mixer 512 indicates a carry from the quinary portion of a digit position to the binary order of the same digit position. An output from mixer 511 indicates no carry from the quinary portion of a digit position to the binary order of the same digit position.

The output of switch 467 is switched with the output of mixer 511 at switch 513. The output of mixer 497 is switched with the output of mixer 511 at switch 514. The output of switches 466 is switched with the output of mixer 511 at switch 515. Also the output of switch 467 is switched with the output of mixer 512 at switch 516. The output of mixer 497 is switched with the output of mixer 512 at switch 517. The output of switch 466 is switched with the output of mixer 512 at switch 518. The outputs of switches 513, 517, 515 are respectively mixed at mixer 519 and the outputs of switches 516, 514, and 518 are respectively mixed at mixer 521. An output from mixer 519 thus indicates a binary 5 at the output of the adder and an output from mixer 521 indicates a binary 0 output from the adder. The output of mixer 519 is switched with a "D" pulse at switch 522 and the output from switch 522 is capacitively coupled to the input of an inverter 523. At the end of the "D" pulse a positive output is thus produced at the output of inverter 523 to turn a latch 524 "on." Latch 524 may be called the B0 latch of the adder output since if it is turned "on" the output from the binary level of the adder is a B0. The output of mixer 521 is switched with a "D" pulse at switch 525 and the output from switch 525 is capacitively coupled to the input of an inverter 526. At the end of the "D" pulse a positive output is thus produced at the output of inverter 526 to turn a latch 527 "on." Latch 527 is thus turned "on" at the beginning of the next digit time after the digit time of the digits being added. The adder therefore has a one digit delay, that is, its output occurs one digit time later than its input. If latch 527 is turned "on" the output from the binary level of the adder is B5.

The output of switch 467 is mixed with the output of switch 517 at mixer 528 and the output of mixer 528 is switched with a "D" pulse at switch 529. The output of switch 529 is capacitively coupled to the input of an inverter 531 so that at the end of "D" time latch 508 is turned on to indicate a carry to the quinary level of the next order. The output of switch 466 is mixed with the output of switch 514 at mixer 532. The output of mixer 532 is switched with a "D" pulse at switch 533. The output of switch 533 is capacitively coupled to the input of an inverter 534 so that at the end of "D" time, latch 509 is turned "on" to indicate no carry to the next order.

The output of switch 492 is mixed with the output of mixer 501 at mixer 535. The output of mixer 505 is mixed with the output of mixer 499 at mixer 536. The output of mixer 504 is mixed with the output of mixer 498 at mixer 537, and the output of mixer 503 is mixed with the output of switch 474 at mixer 538. The output of mixer 535 is switched with the output from the "on" side of latch 509 at switch 539 and with the output from the "on" side of latch 508 at switch 541. The output of mixer 536 is switched with the output from the "on" side of latch 509 at switch 542 and with the output from the "on" side of latch 508 at switch 543. The output of mixer 537 is switched with the output from the "on" side of latch 509 at switch 544 and with the output from the "on" side of latch 508 at switch 545. The output of mixer 538 is switched with the output from the "on" side of latch 509 at switch 546 and with the output from the "on" side of latch 508 at switch 547. The output of mixer 502 is switched with the output from the "on" side of latch 509 at switch 548 and with the output from the "on" side of latch 508 at switch 549. The outputs of switches 539 and 549 are mixed at mixer 551, the outputs of switches 541 and 542 are mixed at mixer 552, the outputs of switches 543 and 544 are mixed at mixer 553, the outputs of switches 545 and 546 are mixed at mixer 554, and the outputs of switches 547 and 548 are mixed at mixer 555.

The output of mixer 551 is switched at switch 556 with a "D" pulse and the output of switch 556 is capacitively coupled to the input of an inverter 557 so that at the end of the "D" pulse inverter 557 produces an output to turn a latch 558 "on." The output of mixer 552 is switched at switch 559 with a "D" pulse and the output of switch 566 is capacitively coupled to the input of an inverter 561 so that at the end of the "D" pulse inverter 561 produces an output to turn a latch 562 "on." The output of mixer 553 is switched at switch 563 with a "D" pulse and the output of switch 563 is capacitively coupled to the input of an inverter 564 so that at the end of the "D" pulse inverter 564 produces an output to turn a latch 565 "on." The output of mixer 554 is switched at switch 566 with a "D" pulse and the output of switch 566 is capacitively coupled to the input of an inverter 567 so that at the end of the "D" pulse inverter 567 produces an output to turn a latch 568 "on." The output of mixer 555 is switched at switch 572 with a "D" pulse and the output of switch 572 is capactively coupled to the input of an inverter 569 so that at the end of the "D" pulse inverter 569 produces an output to turn a latch 571 "on."

The latches 558, 562, 565, and 568, and 571 are respectively the Q0, Q1, Q2, Q3, and Q4 output latches from the adder. The output from the adder is taken from the "on" side of latches 524, 527, 558, 562, 565, 568, and 571, respectively, one digit time later than the inputs to the adder.

*The controls*

Referring to Fig. 1*g* there are shown the circuits in block diagram form that go to control the floating decimal system. When it is desired to shift the numeric data standing in the condenser storage matrix of Figs. 1*a* and 1*b* so that the first significant digit of the data will appear in the highest order position of the matrix, a positive voltage signal is applied to line 301 from any desired source, not shown. This signal is switched at switch 302 with a DG10U pulse and a "C" pulse. The output of switch 302 is fed through a cathode follower 303 and switched at switch 304 with a signal indicating that the highest order position of the matrix has a 0 therein. The signal indicating a 0 in an order of the matrix is taken from the output of a switch 305. The inputs to switch 305 are the on time output lines from the B0 level and the Q0 level of the matrix storage device of Figs. 1*a* and 1*b*. The output of switch 304 is fed to the input of a latch 306 to turn latch 306 "on." The output from the "on" side of latch 306 is switched at switch 307 with the signal on line 301 and a DGXL pulse. The output of switch 307 is fed to the input of a cathode follower 308. The output of cathode follower 308 is fed to the input of a latch 309 to turn latch 309 "on." The output from the "on" side of latch 309 is switched at switch 311 with a DGXL pulse. The output of 311 is fed to the input of a cathode follower 312. The output of cathode follower 312 is fed to the input of a cathode follower 313 and through mixer 314 to the input of a cathode follower 315. The output of a cathode follower 316 is fed to the input of a cathode follower 317 and through mixer 314 to the input of the cathode 315. The outputs of cathode followers 315, 313, and 317 are respectively connected to the lines 459, 463, and 464 respectively of the "B" input to the adder. A signal at the input of cathode follower 312 at DGXL time thus enters a 1 into the "B" binary entry of the adder at DGXL time.

DGXL and DGOL pulses are mixed at a mixer 321 and applied to the input of an inverter 322. The output of inverter 322 is fed through a cathode follower 323 and switched at switch 324 with the output from the "on" side of latch 309. The output of switch 324 is fed to the input of a cathode follower 325.

The outputs from cathode follower 325 is fed to switches 327 to be switched with the on time output from the storage matrix of Figs. 1*a* and 1*b*. The output of switches 327 is fed to the "A" entry of the adder. The output of switches 327 may be inverted by inverter 328 and switched at switch 329 with the early output from the storage matrix. Thus, either the on time outputs or the early outputs from the storage matrix are fed to the "A" entry of the adder depending on whether a left shift is to be performed.

A 1 will thus be entered into the DOL position of the storage matrix without a shift for each shift of the data in the other orders of the storage matrix since the adder has a delay time of one digit.

The outputs from the B5, Q4, Q3, Q2, and Q1 levels of the adder are respectively mixed at mixer 331 and fed to the input of a cathode follower 332. The output of cathode follower 332 is switched at switch 333 with the output from the "on" side of latch 306, a "C" pulse, and a DG10U pulse. The output of switch 333 is fed to the input of a latch 334 to turn latch 334 "on" at DG10U time when the output of the adder does not manifest a digit 0. The output from the "on" side of latch 334 is fed to the reset of latch 306 to turn latch 306 "off". This completes the shift of data since the output of the adder causing latch 334 to be turned "on" is entered into the highest order position of the storage matrix at DG10U time and this output is a significant digit. The output from the "on" side of latch 334 is also fed to the reset of latch 309 to turn latch 309 "off" and thus disenable the addition of 1 into the DOL order of the storage matrix and to discontinue the left shift signal applied to switch 327.

An inverted DGXL pulse from the output of inverter 330 is switched at switch 326 with the output from the "on" side of latch 306. The output of switch 326 is fed to the input of cathode follower 316 to enter a 0 into the A entry of the adder at each digit time except DGXL time. As a significant digit is entered into the highest order of the storage matrix of Figs. 1*a* and 1*b* the signal on line 301 is terminated.

Data may be initially entered into the storage matrix of Figs. 1*a* and 1*b* and into the auxiliary storage matrix of Figs. 1*e* and 1*f* from a source of data indicated generally at 15 in Fig. 1*f*.

In order that the data from the auxiliary storage matrix may be merged with the data from the storage matrix of Figs. 1*a* and 1*b*, a signal may be applied to the switches 340 at the output of the auxiliary storage matrix to allow the data from the auxiliary storage matrix to be entered into the "B" entry of the adder. Data from the storage matrix of Figs. 1*a* and 1*b* will be entered simultaneously into the "A" entry of the adder, and the output of the data is the sum of the numeric data standing in the two storage matrices. This output is entered back into the storage matrix of Figs. 1*a* and 1*b* through switches 341. The above outlined merging operation may be repeated as many times as is desired.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine, a data storage device having a first denominational order of data storage elements and a plurality of other denominational orders of data storage elements each capable of having numeric data stored therein, means for repeatedly conveying data out of successive ones of said denominational orders of storage elements during successive time intervals, means for sequentially conveying data into said denominational orders of data storage elements, a one digit adder having a delay time equal to one of said time intervals, means coupling to said adder the means for repeatedly conveying data out of each one of said denominational orders of storage elements, means coupling to said adder the means for conveying data into each one of said denominational orders of data storage elements, a delay device having a delay time equal to one of said time intervals, means coupling to said delay device the means for repeatedly conveying the data out of said denominational orders of storage elements, means coupling said delay device to said adder, means for disabling said means coupling to said adder the means for repeatedly conveying data out of each one of said denominational orders of storage elements during a plurality of said time intervals, and means for disabling said means coupling said delay device to said adder during another of said time intervals so that the data in said plurality of other denominational orders of storage elements is shifted through successive denominational orders of storage elements.

2. Apparatus as described in claim 1, in combination with means for entering zero's into said adder during said plurality of time intervals and for entering a 1 into said adder during said other of said time intervals for each repeated conveyance of data from said data storage device.

3. Apparatus as described in claim 2, in combination with auxiliary storage means, means for conveying data to said adder from said auxiliary storage means simultaneously with the conveyance of data from said data storage device, means for disabling said means for entering zero's and 1's into said adder, and means for selectively enabling and disabling said means for coupling to said adder the means for repeatedly conveying data out of each one of said denominational orders of storage elements during said plurality of time intervals and said means coupling said delay device to said adder during said other of said time intervals respectively.

4. In a data processing machine, the combination comprising a plurality of first denominational orders of data storage elements adapted to have manifestations of data stored therein, a second denominational order of data storage elements adapted to have manifestations of data stored therein, means adapted to successively shift data manifestations stored in said first denominational orders of data storage elements from lower to higher denominational orders, means for initiating the operation of said shifting means, means responsive to each of successive shifts of data manifestations in said first denominational orders of data storage elements for entering a count into said second denominational order of data storage elements, and means responsive to the appearance of a significant digit in a predetermined denominational order of said plurality of first denominational orders of data storage elements for terminating the operation of said shifting means.

References Cited in the file of this patent

UNITED STATES PATENTS

| | | |
|---|---|---|
| 2,538,636 | Williams | Jan. 16, 1951 |
| 2,604,262 | Phelps et al. | July 22, 1952 |
| 2,609,143 | Stibitz | Sept. 2, 1952 |
| 2,701,095 | Stibitz | Feb. 1, 1955 |
| 2,796,592 | Burkhart et al. | Nov. 6, 1956 |
| 2,798,156 | Selmer | July 2, 1957 |
| 2,800,277 | Williams | July 23, 1957 |